United States Patent
Humlong

[15] 3,652,105
[45] Mar. 28, 1972

[54] BICYCLE KICKSTAND
[72] Inventor: Robert F. Humlong, Maysville, Ky.
[73] Assignee: Wald Manufacturing Company, Incorporated, Maysville, Ky.
[22] Filed: May 8, 1970
[21] Appl. No.: 35,639

[52] U.S. Cl. ........................................................... 280/301
[51] Int. Cl. ............................................................ B62h 1/02
[58] Field of Search .................. 280/301, 302, 304, 293, 298; 248/73, 74, 351, 230, 188

[56] References Cited

UNITED STATES PATENTS

| | | | |
|---|---|---|---|
| 2,308,794 | 1/1943 | Thompson | 280/301 |
| 3,046,040 | 7/1962 | Luper | 248/230 X |
| 2,657,941 | 11/1953 | Adzima | 280/301 |
| 795,599 | 7/1905 | Foster | 280/301 X |
| 2,615,729 | 10/1952 | Atwood et al. | 280/301 |
| 2,735,694 | 2/1956 | Atwood et al. | 280/301 |

*Primary Examiner*—Kenneth H. Betts
*Attorney*—J. Warren Kinney, Jr.

[57] ABSTRACT

The kickstand includes simple quick-attachable means for a safe and effective mounting thereof upon a bicycle frame characterized by a single tubular shank member that connects the crank housing with the lower rear wheel fork of the frame; the mounting including a single fastener, and means to preclude mutilation or collapse of the shank member incident to installation and use of the kickstand.

11 Claims, 3 Drawing Figures

PATENTED MAR 28 1972 3,652,105

INVENTOR
ROBERT F. HUMLONG

BY  J. Warren Kinney Jr.
ATTORNEY

BICYCLE KICKSTAND

This invention relates to a kickstand for bicycles or the like.

The kickstand herein disclosed is adapted especially for application to a bicycle frame wherein the lower rear wheel fork is connected to the crank housing by means of a single tubular shank member, the longitudinal axis of which bisects the fork. In a construction of this kind, it is important that the kickstand be so mounted as to preclude unsafe dislocation of the stand in the event of mounting fasteners becoming loose or bent in service. Of importance also is the factor of avoiding crushing or distortion of the shank member during installation and use of the kickstand, with possible weakening of the rear fork and its connection with the pedal crank housing.

An object of the invention is to provide a simple, durable, yet safe and effective kickstand for application to the single tubular shank member of the lower rear fork of a bicycle frame.

Another object of the invention is to provide in a kickstand of the character stated, mounting means therefor which will reliably support the kickstand without risk of crushing or deforming the lower rear fork shank member, during installation or use of the kickstand, or in the event of accidental loosening of the mounting means.

Another object of the invention is to provide a kickstand of the character stated, which is inexpensive to manufacture and install, and which enhances the appearance of a bicycle.

The foregoing and other objects are attained by the means described herein and illustrated upon the accompanying drawing, in which.

Figure 1:
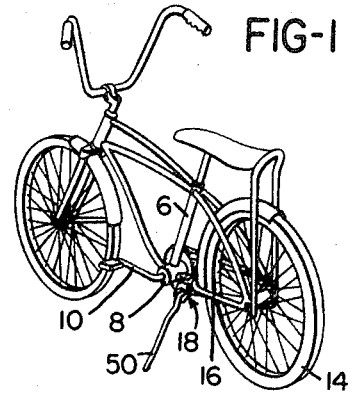
FIG. 1 is a perspective view of a bicycle having a single tubular shank member of the lower rear wheel fork supporting the improved kickstand of the present invention, the kickstand support leg being shown in the operative supporting position.
Figure 2:
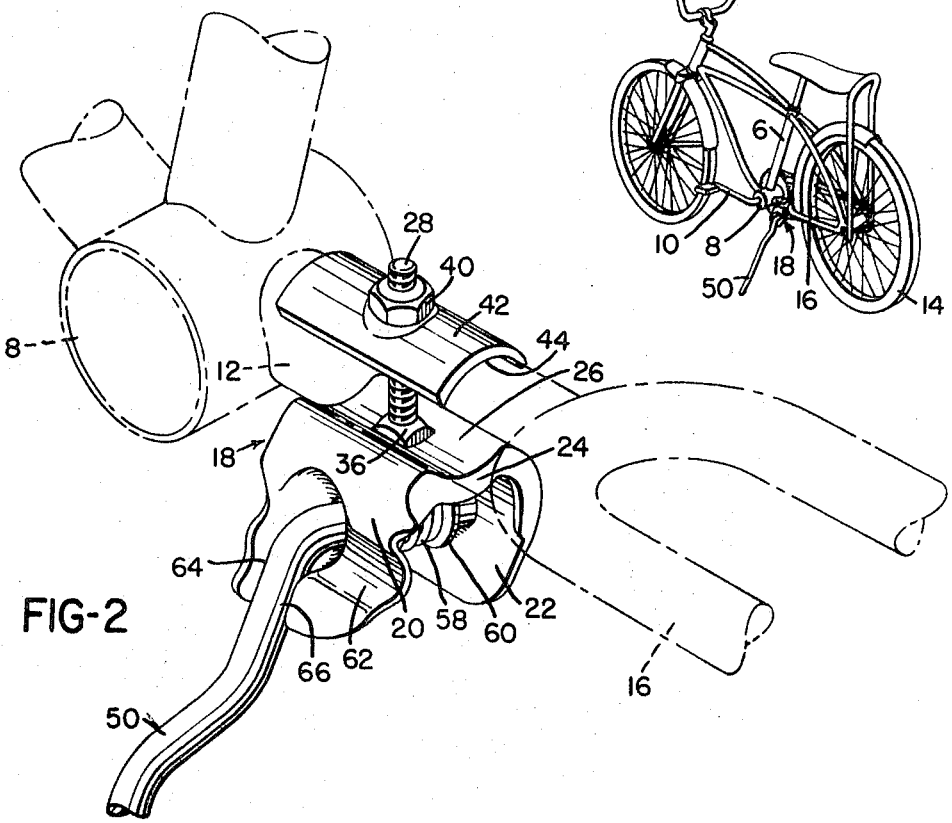
FIG. 2 is an enlarged detailed perspective view showing the kickstand installed upon the single tubular shank member of the lower rear wheel fork of the bicycle frame.
Figure 3:
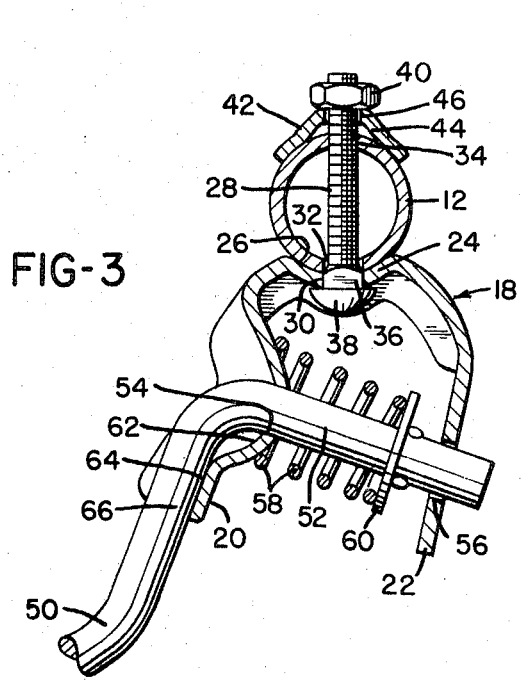
FIG. 3 is a vertical cross section taken through the mounting bolt illustrated by FIG. 2.

In the drawing, the bicycle frame generally is denoted 6, and includes a crank housing 8 for the bearings of a pedal crank or hanger 10. To the housing 8 is welded or brazed a single tubular shank member 12 which forms part of a lower rear wheel fork 16, within which the rear wheel 14 is supported for rotation. The fork 16 usually is substantially horizontally disposed, and the longitudinal axis of the single shank member 12 substantially bisects the fork. Shank member 12 may be hollow, and substantially cylindrical in form.

The kickstand includes an inverted substantially U-shaped bracket 18 which is formed of a rigid and durable metal, and comprises a pair of depending side walls 20 and 22 joined by an upper elongate connecting portion 24. Said connecting portion 24 has an upper elongate concavity 26 formed therein, providing an open-topped elongate trough receptive of the single tubular shank member 12. The arcuacy of trough 26 preferably corresponds to the external cylindrical curvature of shank portion 12, so as to provide a supportive bearing of substantial area.

Bracket 18 may be mounted upon shank member 12 by means of a single bolt or equivalent anchor means 28 the shank of which passes through an opening 30 of bracket portion 24, and through vertically aligned openings 32 and 34 formed in shank member 12. Opening 30 may be squared to accommodate the square portion 36 at the head 28 of the mounting bolt, thereby to prevent rotation of the bolt when its nut 40 is rotated in attaching or detaching the bracket. Anchor means other than bolt 28 may be selected, as desired, for installing the kickstand bracket upon the single tubular shank member 12.

A bearing plate 42 of rigid durable metal may be provided to cap and embrace the upper cylindrical surface of shank member 12, said plate 42 being forced against the external curved surface of the shank member by tightening the nut 40. Bearing plate 42 is elongate of form, and has a concave elongate inner wall 44 furnishing an extensive contact area or bearing area overlying shank member 12. The inner wall 44 may be formed to correspond substantially with the arcuacy or external curvature of shank member 12, and will be apertured at 46 to receive bolt 28. By reason of the extensive bearing area provided between plate 42 and shank member 12, risk of collapsing or deforming the shank member when tightening the nut 40 or otherwise imposing compressive force incident to use of the kickstand, is effectively eliminated.

The length of bearing plate 42 is substantial, and may approximate the length of the trough portion 26 of bracket 18. The bearing plate is secured to shank member 12 by the same anchoring means that fixes bracket 18 thereto, namely, the fastener 28.

Bicycle support means for the kickstand may include a leg 50 of rigid metal pivotally mounted upon one or both walls of bracket 18, for swinging movement between an operative support position as indicated, and a retracted or elevated inoperative position approximately parallel to fork 16.

Leg 50 may include a shaft portion 52 rockingly supported in apertures 54 and 56 of the bracket walls. The shaft portion may carry a compression spring 58 acting against a washer 60 to constantly yieldingly bias the leg against the outer face of bracket wall 20, where said outer face is provided with a lateral depression 62 and an upwardly inclined depression 64 arranged substantially at right angles thereto. A camming area 66 of leg 50 is adapted to enter depression 62 or depression 64, depending upon the lateral or the upright disposition of leg 56, with the force of spring 58 acting to yieldably retain the leg in either of the positions selected. In the upright position of leg 50 as shown, the leg is operative to support the bicycle in standing position, FIG. 1. Other means of relating leg 50 to bracket 18 may be resorted to, if desired.

In the light of the present disclosure, it will be appreciated that the improved kickstand may be installed easily and quickly with minimal effort and expense. Moreover, the means of anchoring or securing the kickstand bracket to the single tubular shank member of the lower rear fork, is highly effective for avoiding damage or mutilation of the bicycle frame, and assures a non-swivel safe disposition of the kickstand bracket even in the event of nut 40 becoming loose in service.

What is claimed is:

1. A kickstand for a bicycle having a single tubular shank member connecting the crank housing with the lower rear wheel fork of the bicycle frame, and comprising:
    an inverted substantially U-shaped bracket having spaced depending side walls joined by an upper elongate connecting portion, said connecting portion having an upper elongate concavity therein providing an open-top trough receptive of said single tubular shank member;
    bicycle support means comprising a depending leg pivotally mounted on a side wall of said bracket for swinging movement between an operative support position and an inoperative retracted position;
    a bearing plate having a concave face engaging said shank member, said plate being substantially the same length as the bracket;
    and anchor means to detachably secure said bracket and bearing plate to said single tubular shank member, with said shank member resting within the trough aforesaid and the concave face engaging an opposed portion of the shank member, the anchor means passing through the bracket, bearing plate and shank member.

2. The kickstand as defined by claim 1, wherein the contour of said open-top trough corresponds substantially with the external curvature of said tubular shank member.

3. The kickstand as defined by claim 1, wherein the contour of said trough and that of the concave elongate wall of the bearing plate, correspond substantially with the external curvature of said tubular shank member.

4. The kickstand as defined by claim 1, wherein said anchor means includes a fastener passing through aligned openings in said bracket, said bearing plate, and said single tubular shank member.

5. The kickstand as defined by claim 1, wherein said anchor means comprises a single bolt passing through aligned openings in said bracket, said bearing plate, and said single tubular shank member.

6. In combination, the single tubular shank member connecting the crank housing with the lower rear wheel fork of a bicycle frame; an inverted substantially U-shaped kickstand bracket having spaced depending side walls joined by an upper elongate connecting portion, said connecting portion having an upper elongate concavity therein providing an open-top trough receptive of said single tubular shank member; bicycle support means comprising a depending leg pivotally mounted on a side wall of said bracket for swinging movement between an operative support position and an inoperative retracted position; a bearing plate having a concave face engaging said shank member, said plate being substantially the same length as the bracket; and anchor means to detachably secure said bracket and bearing plate to said single tubular shank member, with said shank member resting within the trough aforesaid and the concave face engaging an opposed portion of the shank member, the anchor means passing through the bracket, bearing plate and shank member.

7. The combination as defined by claim 6, wherein said anchor means comprises a fastener passing through aligned openings in said trough, said bearing plate and said single tubular shank member.

8. The combination as defined by claim 6, wherein the contour of said open-top trough corresponds substantially with the external curvature of said tubular shank member.

9. The combination as defined by claim 6, wherein the contour of said trough and that of the concave elongate wall of the bearing plate, correspond substantially with the external curvature of said tubular shank member.

10. The combination as defined by claim 9, wherein said anchor means comprises a single bolt passing through aligned openings in said bracket and said single tubular shank member.

11. The combination as defined by claim 9, wherein said anchor means comprises a fastener passing through aligned openings in said trough and said single tubular shank member.

* * * * *